June 7, 1960 E. W. VAN WINKLE 2,940,052

FREQUENCY CONTROL AND SYNCHRONIZING CIRCUIT

Filed March 8, 1954 3 Sheets-Sheet 1

INVENTOR.
EDGAR W. VAN WINKLE
BY George Sipkin
Lee J. Huntzinger
ATTORNEYS

FREQUENCY CONTROL AND SYNCHRONIZING CIRCUIT

Filed March 8, 1954 3 Sheets-Sheet 2

INVENTOR.
EDGAR W. VAN WINKLE
BY George Sipkin
Lee J. Huntzberger
ATTORNEYS

June 7, 1960 E. W. VAN WINKLE 2,940,052

FREQUENCY CONTROL AND SYNCHRONIZING CIRCUIT

Filed March 8, 1954 3 Sheets-Sheet 3

INVENTOR.
EDGAR W. VAN WINKLE
BY George Lipkin
Lee J. Huntzberger
ATTORNEYS

United States Patent Office 2,940,052

Patented June 7, 1960

2,940,052

FREQUENCY CONTROL AND SYNCHRONIZING CIRCUIT

Edgar W. Van Winkle, Rutherford, N.J., assignor to the United States of America as represented by the Secretary of the Navy Filed Mar. 8, 1954, Ser. No. 414,918

3 Claims. (Cl. 331—47)

Figure 1:
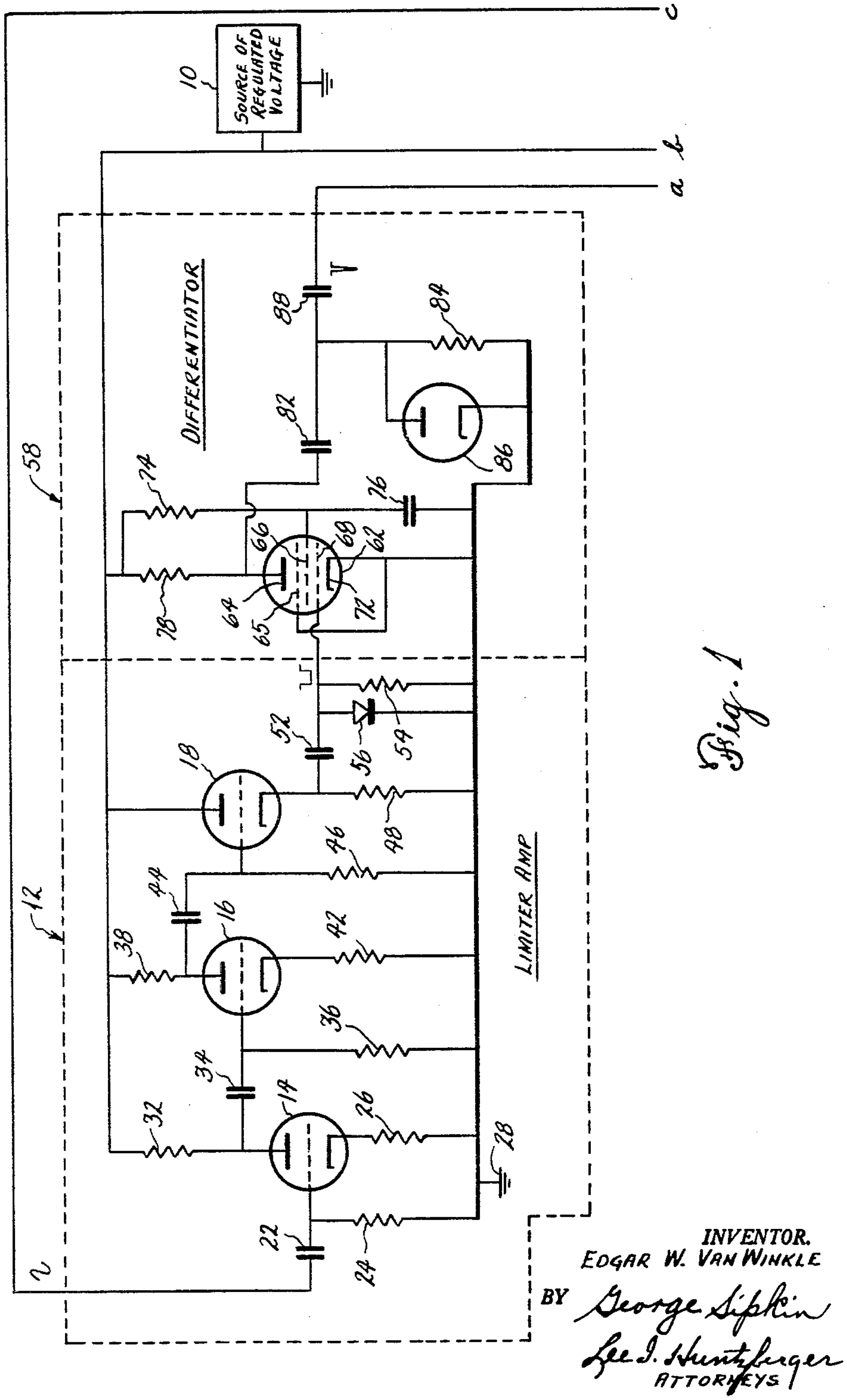

This invention relates to a frequency control circuit and more particularly to a frequency discriminator circuit for generating a direct-current voltage whose magnitude is proportional to the frequency of an input sinusoidal voltage thereto for controlling a sweep generator output frequency.

The beam of a cathode ray tube is caused to be swept at a desired rate under the control of a sweep generator. The sweep generator can be set up as an independent free-running sweep source which can be adjusted to sweep at the proper frequency with a source of synchronizing pulses linked thereto to control the beginning of each sweep cycle. The synchronizing pulse may be derived from incoming intelligence transmitted from a remote location, by means of a gate circuit from an external source such as a frequency standard, or from a high stability local oscillator. No matter what the source of the synchronizing pulse, it is first necessary to adjust the output frequency of the sweep generator by means of a frequency control potentiometer on the sweep generator. Synchronizing means is needed because experience has shown that instability in the resistance of control potentiometer in a sweep generator circuit causes considerable instability in the sweep rate. This instability can be both of a short term and a long term nature. Accordingly, it is necessary to take steps to utilize a stable source of voltage to improve the sweep generator stability. However, the use of synchronizing means in itself does not overcome all the required attention inherent in controlling the sweep generator for providing the proper sweep frequency. Before the synchronizing source such as the stable oscillator can be used to provide the synchronizing signal, it is necessary first to adjust the sweep generator frequency control potentiometer to obtain the proper frequency. Then it is necessary to adjust the oscillator frequency to provide a synchronizing voltage. This involves two separate adjustments. By means of this invention the oscillator is utilized not only as a source of synchronizing voltage pulses, but also as a source of control voltage for the purpose of controlling the natural frequency of the sweep generator. By relying upon one source for both the synchronizing voltage and the control voltage for determining the frequency of the output of a sweep generator, the sweep frequency is synchronized automatically in accordance with the frequency of the stable oscillator.

An object of this invention is to provide a frequency control circuit.

A further object is to provide a frequency discriminator for controlling sweep frequency automatically.

A further object is to provide a frequency discriminator circuit adapted to generate a direct-current voltage which is directly proportional to the frequency of the signal voltage input thereto.

A further object is to provide a frequency discriminator circuit for generating the control voltage for a sweep generator.

A further object is to provide a frequency control circuit for generating a control voltage for a sweep generator, which control voltage is of a magnitude directly proportional to the frequency of a stable reference voltage.

Figure 2:
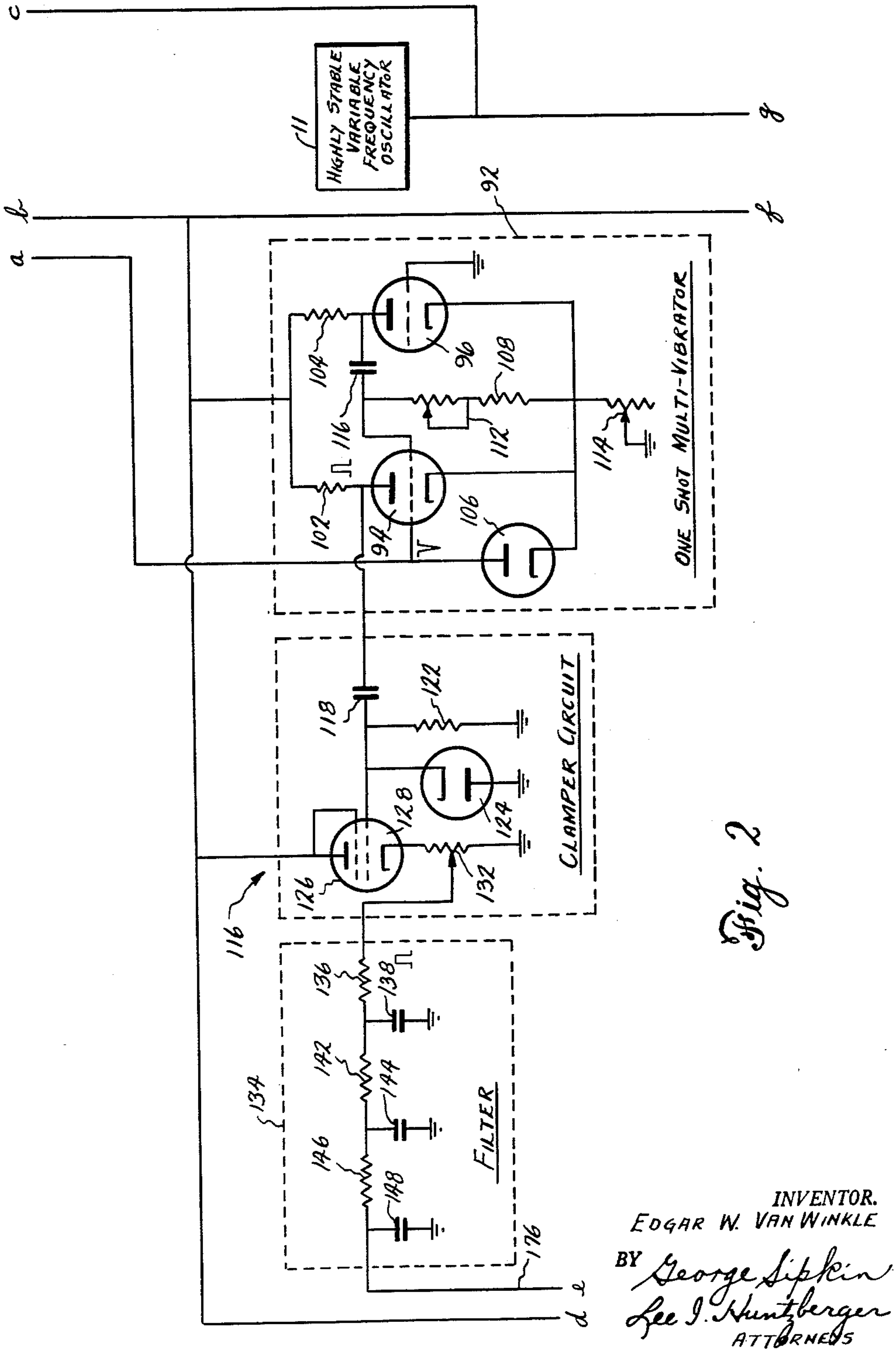
Figure 3:
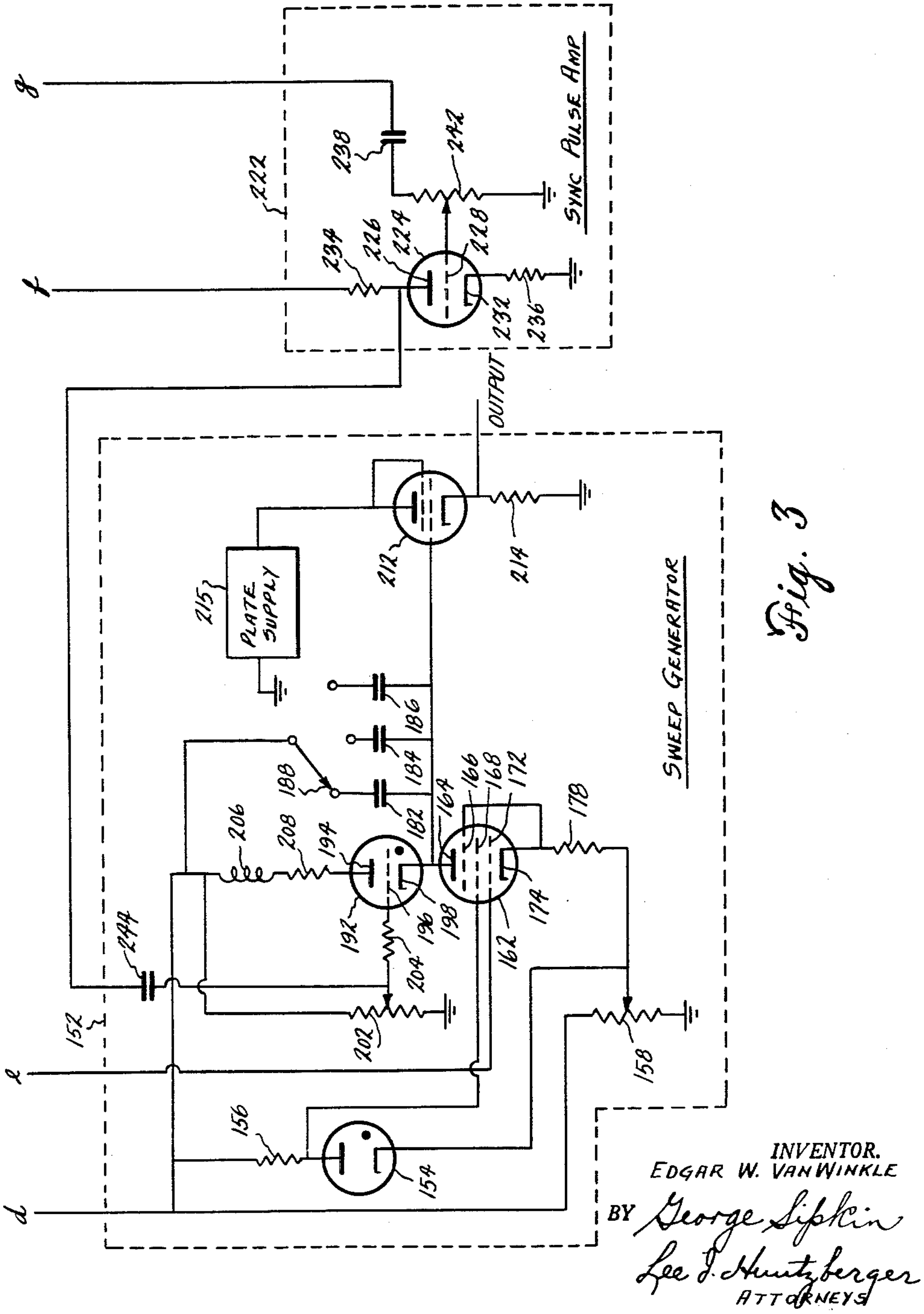

Other objects and many of the attendant advantages of this invention will be readily appreciated as the same becomes better understood by reference to the following detailed description when considered in connection with the accompanying drawings wherein:

Figs. 1, 2, and 3 are the portions of a circuit diagram of an embodiment of a frequency control circuit according to this invention in combination with a sweep generator. The circuit portion in Fig. 1 connects to the circuit portion in Fig. 2 at *a*, *b*, *c*. The circuit portion in Fig. 2 connects to the circuit portion in Fig. 3 at *d*, *e*, *f*, and *g*.

The embodiment of the invention shown on the drawings includes a conventional regulated voltage source 10 for use as a plate supply and a conventional highly stable variable frequency oscillator 11. A limiter amplifier 12 is connected to the output of the highly stable variable frequency oscillator 11. The limiter amplifier 12 serves the purpose of processing a sinusoidal input voltage into a voltage of substantially rectangular waveform. The limiter amplifier 12 includes in cascade a triode 14, triode 16, and a triode 18. The triode 14 is coupled to the highly stable variable frequency oscillator by means of a condenser 22 and a resistor 24. The time constant of the resistor-capacitor coupling is very large, being on the order of one second whereby the circuit may be used at very low frequencies. A cathode bias resistor 26 and a plate load resistor 32 is connected in circuit with triode 14. A source of reference potential hereinafter referred to as ground is conventionally indicated at 28. Triode 14 (e.g. 6C4) operates as a cutoff limiter. The output voltage of a cutoff limiter stage processing a sinusoidal voltage input is a waveform wherein negative half cycles are substantially sinusoidal whereas positive half cycles are sinusoidal but cutoff to provide a plateau. The output voltage of the triode 14 is coupled into a similar succeeding stage including the triode 16 (e.g. ½12AX7) through a coupling condenser 34 and a grid-leak resistor 36. In circuit with triode 16 is a plate load resistor 38 and a cathode bias resistor 42. The output voltage of the triode 16 is coupled to a succeeding stage including the triode 18 (e.g. ½12AX7) through a coupling condenser 44 and grid-leak resistor 46. Triode 18 is connected as a cathode follower and includes a cathode resistor 48. The time constant of each of the resistor-condenser couplings are considerably greater than the period of one cycle of the signal input. The stepped-up energy level output from the cathode follower tube 18 is coupled to a clamping diode 56 (e.g. IN34) through a coupling condenser 52 and condenser charging resistor 54 of long time constant. Because the cathode end of the germanium diode 56 is connected to ground, and because of the long time constant, the output voltage of the limiter amplifier 12 has a waveform approximating a series of negative rectangular pulses which are developed across resistor 54.

The negative output voltage of the limiter amplifier 12 is coupled into a differentiator circuit 58. The differentiator includes a sharp cutoff pentode (e.g. 6AG5) 62. The pentode 62 has a plate 64, a suppressor grid 65, a screen grid 66, a control grid 68 and a cathode 72. The cathode 72 is connected directly to ground. A positive-bias potential for screen grid 66 is conventionally obtained through the use of a series-connected screen dropping resistor 74 and screen bypass condenser 76 between the plate supply source 10 and ground 28. A plate load resistor 78 is connected in series with the plate 64 of the pentode 62. A condenser 82 and a resistor 84 characterized by a very short time constant and with the resistor 84 defining most of the impedance of the RC combination, are connected across the pentode 62. A diode 86 (e.g. IN34) is connected across resistor 84 with its cathode end connected to ground. Therefore, there is developed across the resistor 84 a series of negative voltage spikes which are coupled to the succeeding stage by means of a coupling condenser 88. The succeeding stage is a one-shot multivibrator 92.

The one-shot multivibrator includes a pair of triodes 94 and 96 (e.g. two halves of a 12AX7). The cathodes of triodes 94 and 96 are connected to one another and to one end of rheostat 114; the tap of rheostat 114 is connected to ground. Identical plate resistors 102 and 104 are connected in circuit with triodes 94 and 96, respectively. Connected between the grid and cathode of the triode 94 is a diode 106, to provide a discharge path for coupling condenser 88, to prevent the grid of triode 94 from going positive. The triggering voltage for the one-shot multivibrator 92 is developed across potentiometer 112 connected in series with fixed resistor 108, both of which are connected between the grid and cathode of triode 94. The plate of the triode 96 is coupled to the grid of the triode 94 by means of a coupling condenser 116. The grid of the triode 96 is connected to ground. In the absence of triggering pulses for the one-shot multivibrator 92, only triode 94 is conducting. However, when a negative triggering pulse is applied to the control grid of the triode 94, the triode 94 is cut off, the current through the rheostat 114 is reduced, the bias on the grid of the triode 96 is raised above cutoff permitting current to flow through the triode 96. The plate potential of the triode 96 drops causing the condenser 116 to discharge through the triode 96. As discharging of condenser 116 progresses, current flow through resistances 108 and 112 decreases, permitting the grid of triode 94 to approach ground potential thereacross. The triode 94 which is held cutoff by the bias created by the current through the resistor 108 and the rheostat 112 begins to conduct, reducing the current flow through the triode 96 due to the increase in the cathode bias of the latter which instantaneously causes the plate voltage of the triode 96 to increase, followed by immediate charging of the condenser 116 which reinforces the action permitting the triode 94 to reach its maximum current level, and causing the triode 96 to again be cut off. The action repeats with each trigger pulse. The period preferably is designed to be 90% of the period of highest frequency of the applied input signal. The output of 92 is a series of positive rectangular pulses of constant duration. The frequency of these positive rectangular pulses equals the applied frequency.

The output voltage of the one-shot multivibrator 92 is coupled into a clamper circuit 116 through a coupling condenser 118. The clamper circuit includes a beam-power tetrode 126 (e.g. 6AQ5), a resistor 122 and a diode 124 (e.g. 6AL5). The time constant of the combination of the coupling capacitor 118 and resistor 122 is very long compared to the period of one cycle of the input signal. Therefore, during the transfer of a positive voltage pulse to the clamper circuit from the one-shot multivibrator 92, the voltage developed across the resistor 122 due to the passage of the charging current of the capacitor 118, remains practically level during the time of one pulse. The discharge current for condenser 118 is bypassed across resistor 122 by diode 124. The beam power tetrode is connected as a cathode follower including the resistance of potentiometer 132 in its cathode circuit. The control grid of the beam-power tetrode 128 is connected directly to the junction between coupling condenser 118 and resistor 122. The positive output voltage of the clamper circuit has a substantially rectangular waveform.

The output of the clamper circuit 116 is coupled into a three-stage RC filter including a resistor 136, a condenser 138, a resistor 142, a condenser 144, a resistor 146, and a condenser 148. The capacitor 138 is relatively large and is roughly 10 times as large as the capacitors 144 and 148. On the other hand, the resistor 146 is about 10 times as large as the resistor 142 and about 100 times as large as the resistor 136.

The sweep generator is generally shown at 152. It includes a voltage regulator tube 154 in series with a current-limiting resistor 156, connected between the plate voltage source 10 and the tap of a potentiometer 158. The resistance winding of the potentiometer 158 is connected directly between the supply source 10 and ground. The sweep generator 152 further includes a sharp cutoff pentode 162. The pentode 162 includes a plate 164, a suppressor grid 166, a screen grid 168, a control grid 172, and a cathode 174. The potential of the control grid 172 of the sharp cutoff pentode 162 with respect to ground is connected to the output end of the filter 134 by means of a lead 176. A high-value resistor 178 is connected in the cathode circuit of the sharp cutoff pentode 162. The bias on the screen-grid 168 is held constant by means of the voltage regulator tube 154. Because the current through the pentode remains substantially constant, the voltage developed across the resistor 178 likewise remains substantially constant so that the potential of the screen grid 168 relative to the cathode 174 likewise is substantially constant. Alternate charging condensers for the sweep generator 152 are shown at 182, 184, and 186. A selector switch 188 is provided for connecting any one of the three condensers actively into the sweep generator circuit. As shown on the drawing, the condenser 182 is connected in circuit between the source of regulated plate supply voltage 10 and the plate 164 of the constant current pentode 162. During charging of condenser 182, the potential at the plate 164 is equal to the difference between plate supply voltage and the potential developed across the condenser 182. Since the charging current of the condenser 182 is constant as determined by the constant current pentode 162, the voltage at the plate 164 decreases linearly from the voltage at the start of the charging period. A thyratron 192 (e.g. 884) is provided for discharging the condenser 182. The thyratron 192 includes a plate 194, a control grid 196 and a cathode 198. A potentiometer 202 whose resistance winding is connected directly between the source of regulated plate supply voltage 10 and ground is used for providing the bias on the grid 196 corresponding to the desired discharge potential. Connected in series with the grid 196 is a grid current limiting resistor 204. When the condenser 182 charges up to the potential required for breakdown of the thyratron 192, the condenser discharges through the thyratron 192 whereby the potential across the condenser 182 decreases substantially instantaneously to the extinguishing potential of the thyratron 192. Connected in series with the plate 194 of the thyratron is an inductance coil 206 and a plate-load resistor 208. The output of the sweep generator is derived from a beam power tetrode 212 (e.g. 6AQ5). The beam power tetrode 212 is connected as a cathode follower, in series with a cathode resistor 214. A plate supply 215 is provided for the cathode follower output.

Synchronizing voltage for the sweep generator is derived from the synchronizing pulse amplifier 222. The synchronizing pulse amplifier includes a triode 224 having a plate 226, a control grid 228, and a cathode 232, in circuit with a plate-load resistor 234. A cathode bias resistor 236 is connected in series between the cathode 232 and ground. The grid 228 of triode 224 is coupled to the highly stable variable frequency oscillator 11. The coupling means includes a condenser 238 and the resistance winding of a gain control potentiometer 242. The control grid 228 is connected to the tap of the potentiometer 242. The output from the synchronizing pulse amplifier is coupled into the control grid 196 of the thyratron 192 through a coupling condenser 244. Therefore, the thyratron begins to conduct under the combined effects of the synchronizing pulse received on its grid and the potential across condenser 182 as determined by the potential on the control grid of the constant current pentode 162.

In operation, the highly stable oscillator 11 is employed to automatically control the frequency of the output of the sweep generator 152. The stable oscillator 11 acts both as a source of synchronization and a source of control voltage for the purpose of frequency control. The output of the oscillator 11 is supplied to a limiter amplifier 12 which limiter amplifier accepts the sinusoidal signal from the oscillator 11 and distorts it into an essentially rectangular wave. The output of the limiter amplifier 12 is fed into a differentiator circuit 58. The output spikes of the differentiator circuit which are negative with respect to ground are coupled to a one-shot multivibrator 92. The period of the one-shot multivibrator is made equal to about 90% of the period of the highest frequency applied. The output of the one-shot multivibrator 92 is a series of rectangular pulses of constant duration. The repetition rate of the rectangular pulses depends upon the applied frequency from the stable oscillator 11. The average value of this voltage output is a linear function of the applied frequency of the output frequency of stable oscillator 11. This rectangular waveform is clamped to ground so that it is positive and then is filtered to provide a direct-current voltage whose magnitude is a linear function of the frequency of stable oscillator 11. This average voltage is applied to the control grid 172 of the constant current pentode 162 which acts as a frequency control tube in the sweep generator 152. The bias on the grid 172 which is determined by the potential derived from the filter 134 determines the amount of current permitted to flow through the constant current pentode 162. As a result, it also determines the charging rate of the condenser 182. Synchronizing pulses are derived from a synchronizing pulse amplifier 222 which is also connected to the output of the stable oscillator 11. The amplified synchronizing pulses are coupled into the grid circuit of the thyratron 192. Therefore, the output frequency of the highly stable variable frequency oscillator automatically controls the frequency of the sweep generator 152 since it controls the frequency of the synchronizing pulses and the charging rate of the condenser in the sweep generator circuit 152.

A decided advantage of this invention is that in a reproducing system such as facsimile using the scanning principle, the speed of the scan always has to be proportional to the signal speed. A scope unit with this attachment on the horizontal sweep generator could be used to have the sweep automatically adjusted to the signal frequency so that with moderate synchronizing voltage, a standing pattern would always result. This would be true even though it could become necessary to view signals of various frequencies in a rapid manner.

Obviously many modifications and variations of the present invention are possible in the light of the above teachings. It is, therefore, to be understood that within the scope of the appended claims the invention may be practiced otherwise than as specifically described.

I claim:

1. In combination; a direct current power supply; one terminal of said power supply defining a reference potential; a sweep generator connected to said power supply; said sweep generator including a sweep capacitor, a cathode-biased constant-current tube having at least a control electrode, said sweep capacitor and said constant-current tube being connected in series across said power supply, a plate-loaded thyratron connected in parallel with said sweep capacitor, adjustable biasing means connected between said power supply and the control grid of said thyratron; a limiter amplifier constructed and arranged to accept a voltage of pulsating waveform relative to the reference potential and in consequence thereof to generate a voltage of substantially rectangular waveform that is unidirectional relative to the reference potential and is of the same frequency as the frequency of the input voltage, a differentiator electrically connected to said limiter amplifier and adapted to generate a voltage spike synchronous with the leading edge of each pulse of the voltage of rectangular waveform generated by said limiter amplifier, a one-shot multivibrator electrically connected to said differentiator and adapted to generate a voltage of rectangular waveform under the influence of the voltage spikes generated by said differentiator, the repetition rate of the rectangular pulses generated by said one-shot multivibrator being identical to the repetition rate of the voltage spikes, all of the last-mentioned rectangular pulses being identical in waveform, time duration, and amplitude, a clamper circuit electrically connected to said one-shot multivibrator for clamping the last-mentioned voltage of rectangular waveform to the reference potential, a filter connected to said clamper circuit for averaging the output of said clamper circuit to convert the output of said clamper circuit into a unidirectional constant voltage whose magnitude is a linear function of the frequency of the input voltage to said pulsating amplifier; the output end of said filter being connected to the control electrode of said constant-current tube; and a synchronizing pulse amplifier connected at its output end to the control grid of said thyratron and at its input end being adapted to accept the same voltage input as said limiter.

2. In combination with a sweep voltage generator having a sweep capacitor, a constant current charging circuit in series with said capacitor and having an input for direct current control voltage, the level of charging current therethrough being proportional to the level of the direct current control voltage, and a quick discharge circuit connected across said capacitor and having two operating conditions, one of which is a substantially non-conductive condition and the other is a very highly conductive condition, said quick discharge path having an input for synchronizing trigger pulses to initiate the highly conductive condition to permit said capacitor to discharge therethrough following each trigger pulse; an oscillator that is stable and adjustable; means coupled to the output of said oscillator for producing rectangular pulses of equal amplitude and width, one rectangular pulse for each cycle of oscillator output; an averaging circuit coupled to said means for producing a direct current voltage level that is directly proportional continuously to the frequency of the oscillator output, the output of said averaging circuit being coupled to the input for control voltage of said constant current charging circuit; means coupling the output of said oscillator to the input of said quick discharge circuit to provide synchronizing trigger pulses to said quick discharge circuit whereby adjustment of said oscillator adjusts both the natural frequency of said sweep voltage generator and synchronization thereof.

3. In combination with a sweep voltage generator having a sweep capacitor, a charging circuit in series with said capacitor and having means responsive to variable level direct current voltage for controlling the level of charging current through said charging circuit in direct relationship to the level of direct current control voltage applied to said means, and a quick discharge circuit connected across said capacitor and having two operating conditions, one of which is a substantially non-conductive condition and the other is a very highly conductive condition, said quick discharge path having means for accepting synchronizing trigger pulses, said discharge circuit being non-conductive except when a trigger pulse arrives to initiate the highly conductive condition to permit said capacitor to discharge therethrough and following discharge of said capacitor said discharge circuit reverts to its non-conductive condition; an adjustable frequency oscillator; means coupled to said oscillator to receive alternating energy therefrom for providing a direct current voltage level to said charging circuit control means that is continuously directly linearly related to the frequency of the alternating energy from said oscillator; and means coupled to said oscillator to receive alternating energy therefrom for providing a synchronizing trigger pulse to said quick discharge path for each cycle of alternating energy from the oscillator; whereby adjustment of said oscillator adjusts both the natural frequency of said sweep voltage generator and synchronization thereof in accordance with the oscillator frequency.

References Cited in the file of this patent

UNITED STATES PATENTS

| | | |
|---|---|---|
| 2,266,516 | Russell | Dec. 16, 1941 |
| 2,399,135 | Miller et al. | Apr. 23, 1946 |
| 2,441,957 | De Rosa | May 25, 1948 |
| 2,455,265 | Norgaard | Nov. 30, 1948 |
| 2,467,834 | Lasher | Apr. 9, 1949 |
| 2,522,110 | Forster | Sept. 12, 1950 |
| 2,557,038 | Ross | June 12, 1951 |
| 2,570,013 | Hardenberg | Oct. 2, 1951 |
| 2,581,199 | Moe | Jan. 1, 1952 |
| 2,688,693 | Haynes | Sept. 7, 1954 |
| 2,720,584 | Sloughton | Oct. 11, 1955 |